(12) United States Patent
Van Neste et al.

(10) Patent No.: US 11,073,128 B1
(45) Date of Patent: *Jul. 27, 2021

(54) WIND AEOLIPILE

(71) Applicant: TENNESSEE TECHNOLOGICAL UNIVERSITY, Cookeville, TN (US)

(72) Inventors: Charles William Van Neste, Kingston, TN (US); David Wenzhong Gao, Denver, CO (US)

(73) Assignee: Tennessee Technological University, Cookeville, TN (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/709,199

(22) Filed: Sep. 19, 2017

Related U.S. Application Data

(63) Continuation of application No. 14/090,280, filed on Nov. 26, 2013, now Pat. No. 9,765,755, which is a (Continued)

(51) Int. Cl.
*F03D 1/06* (2006.01)
*F03D 15/00* (2016.01)
*F03B 3/12* (2006.01)

(52) U.S. Cl.
CPC ............... *F03D 1/06* (2013.01); *F03B 3/126* (2013.01); *F03D 1/0625* (2013.01); *F03D 15/05* (2016.05); *F05B 2240/20* (2013.01); *Y02E 10/72* (2013.01)

(58) Field of Classification Search
CPC ........ F03D 1/06; F03D 1/0625; F03D 1/0666; F03D 3/06; F03D 3/061; F03D 3/062; (Continued)

(56) References Cited

U.S. PATENT DOCUMENTS 2,799,989 A * 7/1957 Kappus ............... B64C 9/38
239/265.35
8,591,174 B1 * 11/2013 Gao ................... F03D 1/06
415/80
9,765,755 B2 * 9/2017 Gao ................... F03D 1/06

FOREIGN PATENT DOCUMENTS

DE 4414208 A1 * 10/1995 .......... F03D 1/0608
DE 202008000543 U1 * 4/2008 ............ F03D 15/05
(Continued)

*Primary Examiner* — Kenneth Bomberg
*Assistant Examiner* — Christopher R Legendre
(74) *Attorney, Agent, or Firm* — Andre J. Bahou; Blake M. Bernard; Waller, Lansden, Dortch & Davis LLP

(57) ABSTRACT

Described herein is essentially a high-efficiency, hybrid fluid-aeolipile. In operation, this hybrid device is placed in the stream of a moving fluid, preferably air. Energy is extracted from the fluid stream by directing a portion of the stream through and, optionally, around the device. As the fluid-flow moves through the device, it is directed into nozzles. These nozzles, which are free to pivot in a cyclical manner, employ the established phenomenon of "nozzle-effect" to accelerate the velocity of the air-flow passing through them, which is ultimately ejected from each nozzle tip, producing thrust. This thrust, amplified by nozzle-effect, drives the nozzles to pivot around a shared axis. The wind energy, thereby converted into cyclical motion, that may be used to perform useful work, is converted with greater efficiency, than is possible in conventional blade-type wind turbines.

13 Claims, 8 Drawing Sheets

Related U.S. Application Data continuation of application No. 12/592,119, filed on Nov. 19, 2009, now Pat. No. 8,591,174.

(60) Provisional application No. 61/199,771, filed on Nov. 20, 2008.

(58) Field of Classification Search
CPC .. F03D 3/065; F03D 15/05; F03B 3/12; F03B 3/121; F03B 3/126; F05B 2240/20; F05B 2240/21; F05B 2240/221; Y02E 10/72; Y02E 10/721
See application file for complete search history.

(56) References Cited

FOREIGN PATENT DOCUMENTS

| | | | | | |
|---|---|---|---|---|---|
| EP | 1635056 | A1 | * | 3/2006 | ............... F03D 1/04 |
| GB | 700879 | A | * | 12/1953 | ............. F03D 15/05 |

* cited by examiner

WIND AEOLIPILE

This application is a continuation of U.S. patent application Ser. No. 14/090,280, filed Nov. 26, 2013, which is a continuation of U.S. patent application Ser. No. 12/592,119, filed Nov. 19, 2009, now issued as U.S. Pat. No. 8,591,174, which claims benefit of and priority to U.S. Provisional Application No. 61/199,771, filed Nov. 20, 2008, and is entitled to those filing dates for priority. The specifications, figures and complete disclosures of U.S. patent application Ser. Nos. 12/592,119 and 14/090,280 and U.S. Provisional Application No. 61/139,271 are incorporated herein by specific reference for all purposes.

FIELD OF INVENTION

This invention relates generally to the field of deriving energy from wind, and specifically to a wind-energy extraction device that is superior to wind-turbines that employ rotating blades to extract energy from wind.

BACKGROUND OF THE INVENTION

Extant wind-turbines are based on the aerodynamic principles of a wing. The turbine is equipped with wing-shaped turbine blades. As wind blows across the wing-shaped turbine blades, pressure differences generated on either side of the blades, in accordance with Bernoulli's Law, create aerodynamic force, or lift. This induces the blades to rotate, and the rotation drives an electric generator.

The maximum efficiency, according to Betz's law, that a bladed wind turbine can achieve is approximately 59.3%. This has long been considered an absolute limiting function with respect to use of the wind to generate usable energy.

This wind to power extraction available for bladed wind turbines is expressed by the following equation:

$$P = \rho A v^3$$

where P is the power in watts, $\rho$ is the density of air, A is the cross sectional area swept by the blades, and v is the velocity of the wind.

One may easily surmise, then, that the bladed turbine engineer's only practical means of increasing the power output of a given bladed wind turbine design is to increase the swept area of the blades. This produces an only a linear, or one to one, increase in power output, swept-area unit per power-unit.

However, again referring to the equation, if flow velocity could be increased, a disproportionate benefit would be derived. For example, a mere 50 percent increase in flow velocity would quadruple the theoretical power output. A number of turbine designers, in pursuit of this disproportionate benefit, have attempted to exceed Betz limit by exploiting venturi effect of a shroud or casing so configured as to act as a giant nozzle surrounding essentially conventional turbine blades to increase the wind-velocity impinging upon them. The blades in such designs, however, remain as a limiting factor.

In contrast, the herein taught invention uses a novel approach to this energy translation problem. It substitutes convergent/divergent, or venturi, nozzles, resembling those such as would be employed by rockets, in place of turbine blades and thereby provides a means by which wind velocity through the device may be amplified. The convergence/divergence as embodied herein may be contained entirely within the nozzle, or may be manifested by convergence of conduit guided fluid flow which diverges only at ejection.

But in either case, amplifying this flow-velocity, and commensurately, the ejection velocity at the nozzle, a significant increase in output energy is realized. The increase energy, as expresses by the above equation, is not linear function, but is, rather, a function of the cube of the nozzle ejection velocity increase.

If we compare this method of increasing energy output by using nozzles to increase ejection velocity, to the method of increasing output by increasing the blades swept area, the advantage is clear. The ratio of increase based on blade swept area is merely 1 to 1. The increase based on increased ejection velocity, however, is a cubic function, the output energy increasing as a cube of the nozzle ejection velocity.

By exploiting the advantage of the velocity to power function, this invention is able to essentially circumvent the limitations of Betz law by eliminating the employment of precisely the physical components (turbine blades) to which Betz Law applies.

A computational computer model using popular, commercially available three-dimensional and computational fluid dynamics, or CFD, software, was developed for this aeolipile invention to obtain torque production formula, derive efficiency limits, and to demonstrate practicality. Simulations were conducted for a single thrust nozzle to establish flow parameters. For these simulations, an inlet velocity of 2 m/sec was chosen. After 1600 iterations, the corresponding outlet velocity was found to be near 17 m/sec, a flow velocity increase of 15 m/sec, thereby validating the inventions theoretical functionality.

Tests were also conducted with respect to an expanded wind-gathering configuration of a horn-shaped inlet extension as in FIG. 7, below. Test employed inlet airflow velocities of 2, 4, 6, 8, 10, and 12 m/sec and were repeated for various inlet/outlet size ratios. FIG. 8, below plots the flow velocity increases, produced for each inlet/outlet size ratio.

BRIEF SUMMARY OF THE INVENTION

An object of the invention is to provide a means of deriving energy from fluid flow. An application of this invention is translation of wind energy into useful work or into electrical, mechanical, or hydraulic energy.

Other objects and advantages of the present invention will become apparent from the following descriptions, taken in connection with the accompanying drawings wherein, by way of illustration and example, an embodiment of the present invention is disclosed.

In accordance with a preferred embodiment of the invention, there is disclosed a device for extracting energy from fluid flow.

Figure 1:
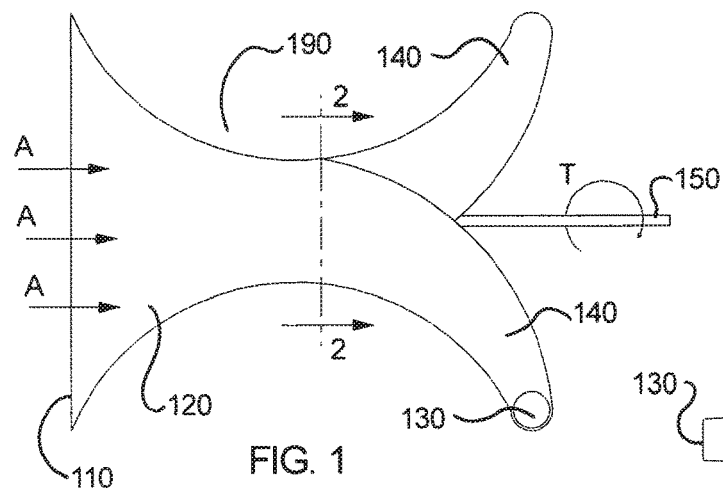
FIG. 1 is a side view of a first embodiment of the wind aeolipile.

LIST OF NUMBERED ELEMENTS 110. nozzle inlet
120. main conduit
130. nozzle outlet
135 divergent nozzle outlet
140. thrust nozzle
142 nozzle choke device
143 eductor-ejector inlet
144 flaps or spoiler
145 blade-shaped thrust nozzle
150. center axis
155 generator, transmission, pump, or other energy translation/transmission device
160. narrow opening between shroud and aeolipile inlet
170. cylinder or shroud
180. horn-shaped inlet extension
185 horn inlet
187 horn outlet
190. aeolipile
A airflow
A1 bypass airflow
A2 re-circulating airflow
T torque

DETAILED DESCRIPTION OF THE PREFERRED EMBODIMENTS

Figure 2:
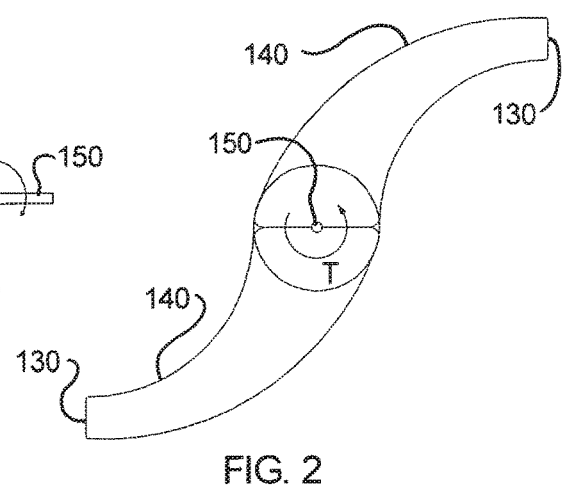
FIG. 2 is a front, cross-sectional, view of the first embodiment of the wind aeolipile.

In a first embodiment, as in FIG. 1 and FIG. 2, air-flow (A) is directed into a main conduit (120) from an enlarged inlet (110). The air will become slightly compressed as it is forced down the thrust nozzles (140), leaving the nozzle outlets (130) at right angles to the nozzle inlet (110).

Figure 2A:
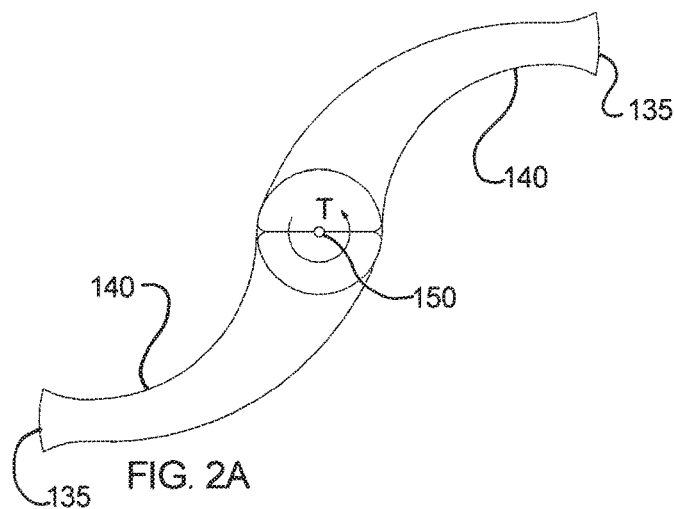
FIG. 2a, is a front, cross-sectional view of the first embodiment of the wind aeolipile employing divergent nozzle outlets

The thrust nozzles (140) are extensions of the main conduit (120). These nozzles (140) act to increase the speed of the air-flow (A) passing through them by "nozzle-effect" wherein the interior walls of the nozzle (140) smoothly converge, and then, optionally, diverge as the air-flow progresses from intake to outlet, according to established nozzle performance dictates. FIG. 2a depicts nozzles having this optional convergent to divergent nozzle form (145). In more sophisticated embodiments, the nozzle shape may be dynamically variable while the device is in operation, to better conform to ambient conditions, thereby increasing efficiency.

Figure 2B:
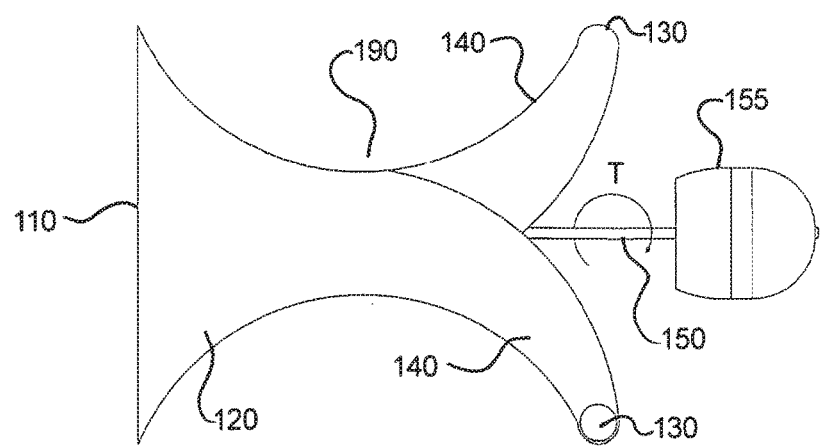
FIG. 2b, is a front, cross-sectional, view of the first embodiment of the wind aeolipile, also employing a generator, transmission, pump, or other energy translation/transmission device

As the flowing air (A) is finally ejected from the nozzle outlet (130), rotational torque (T) is created about a center axis (150). Referring to FIG. 2b, useable work is accomplished by mechanically coupling an electrical generator, mechanical transmission, hydraulic pump, or other energy translation or transmission system (155) to this center axis (150).

The device as depicted in FIGS. 1, 2, 2a, 3, 4, 5 and 6, is configured with two thrust nozzles (140), although as few as one nozzle may be employed, and there is no theoretical maximum number of thrust nozzles (140). The nozzle (140) interior convergent/divergent designs or configurations may be varied according to expected or intended fluid flow rate, specific gravity, and static and dynamic pressure parameters.

Figure 3:
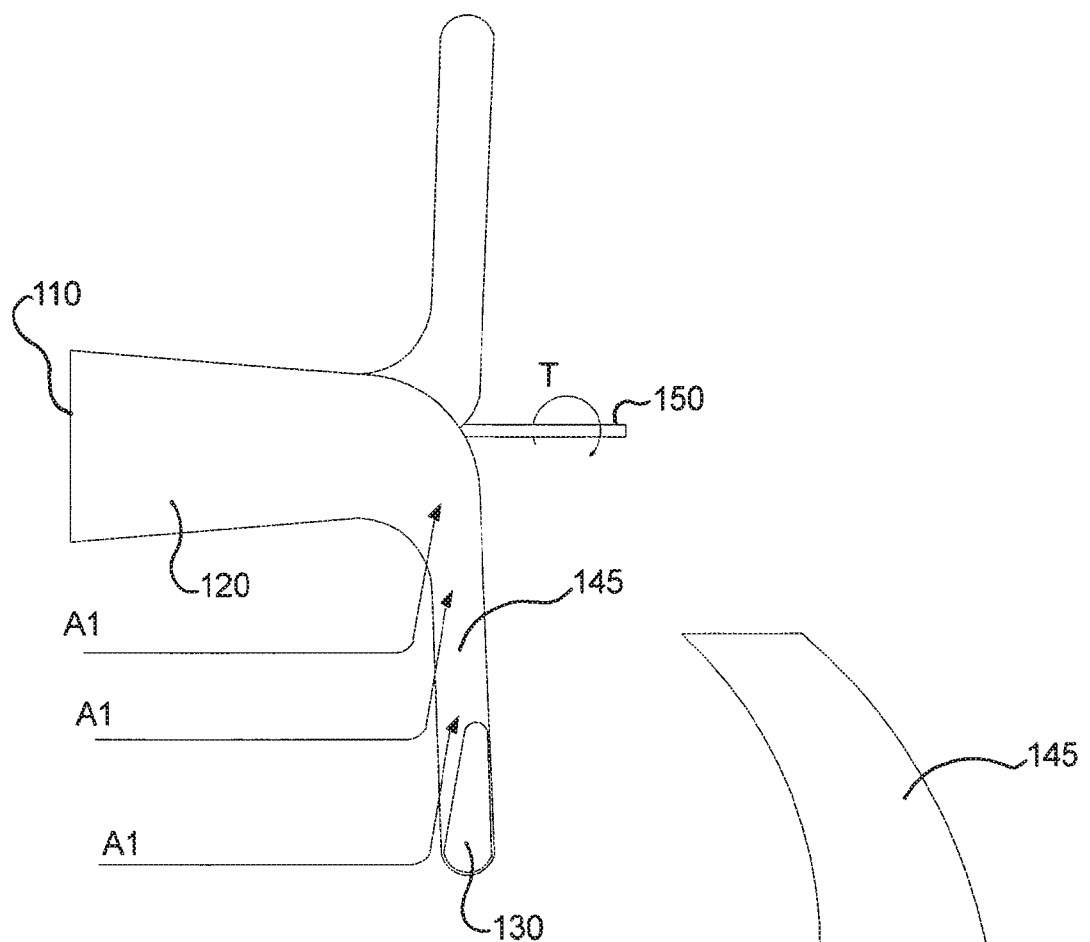
FIG. 3 is a side view of a second embodiment of the wind aeolipile employing blade-shaped nozzles
Figure 4:
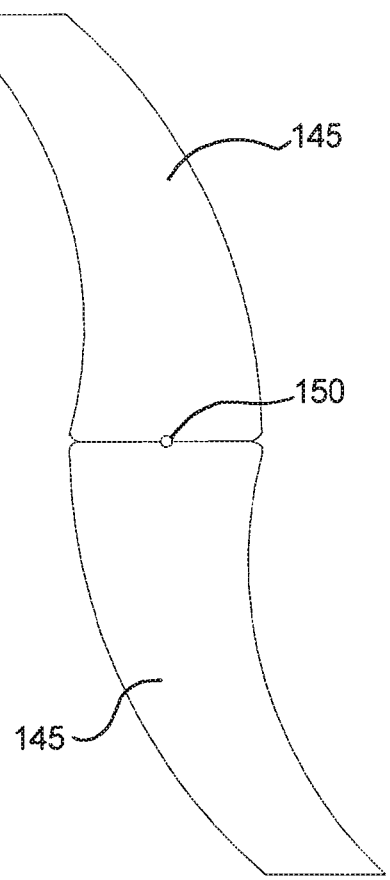
FIG. 4 is a back view of a second embodiment of the wind aeolipile, employing blade-shaped nozzles

In a second embodiment as in FIG. 3 and FIG. 4, thrust nozzles (145) are shaped like hollowed turbine blades. The thrust nozzles (145) extend outward, away from the main conduit (120). Air-Flow entering the main conduit (120) is directed through the thrust nozzle (145) and leaves the outlets (130) at right angles to the center axis (150). The bladed-shaped design of the exterior of the thrust nozzles (145) augments the rotational torque (T) as bypassing air (A1) flows past the outside of the aeolipile nozzles (145).

Figure 5:
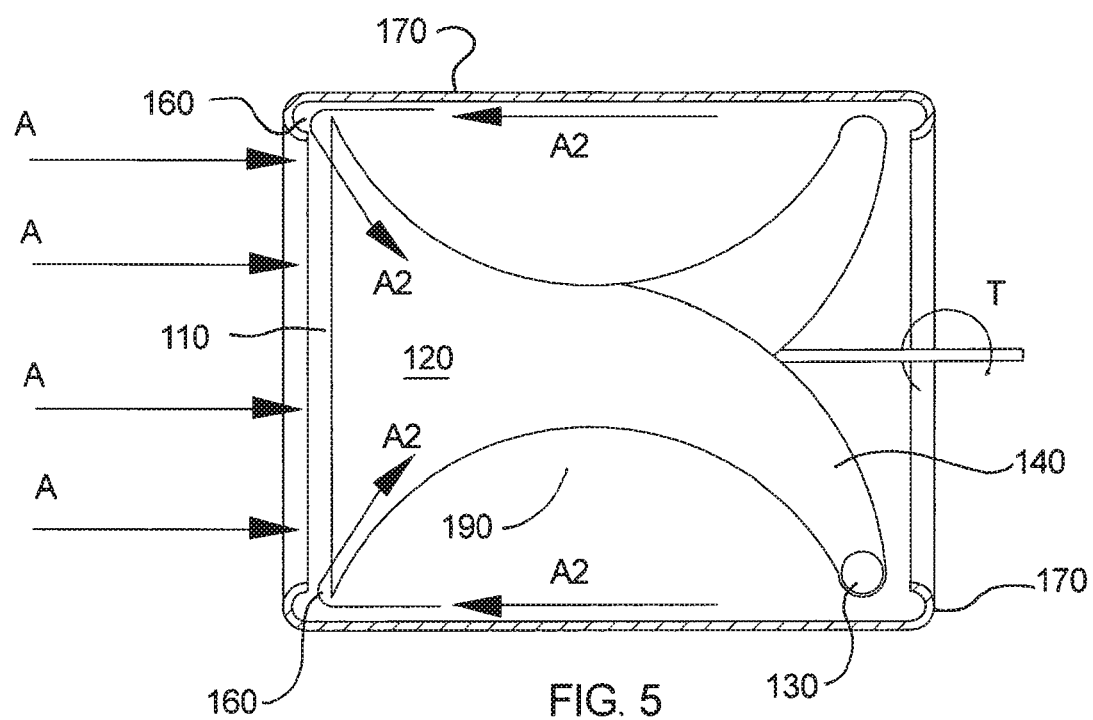
FIG. 5 is a side view of a third embodiment of the wind aeolipile incorporating a surrounding shroud

In a third embodiment, as in FIG. 5, the wind aeolipile essentially as of the first or second embodiment is placed inside a cylinder or shroud (170). As the air-flow (A1) enters the inlet (110), a suction is created at the narrow opening (160) between the rotating portion and the shroud inlet. Further, after the air-flow is ejected from the outlets (130), part of this air-flow (A2) is diverted back through the shroud to ultimately be re-cycled into the inlet (110) again. Recycling of the air-flow increases efficiency of the device, allowing it to operate in lower velocity wind conditions.

Figure 6:
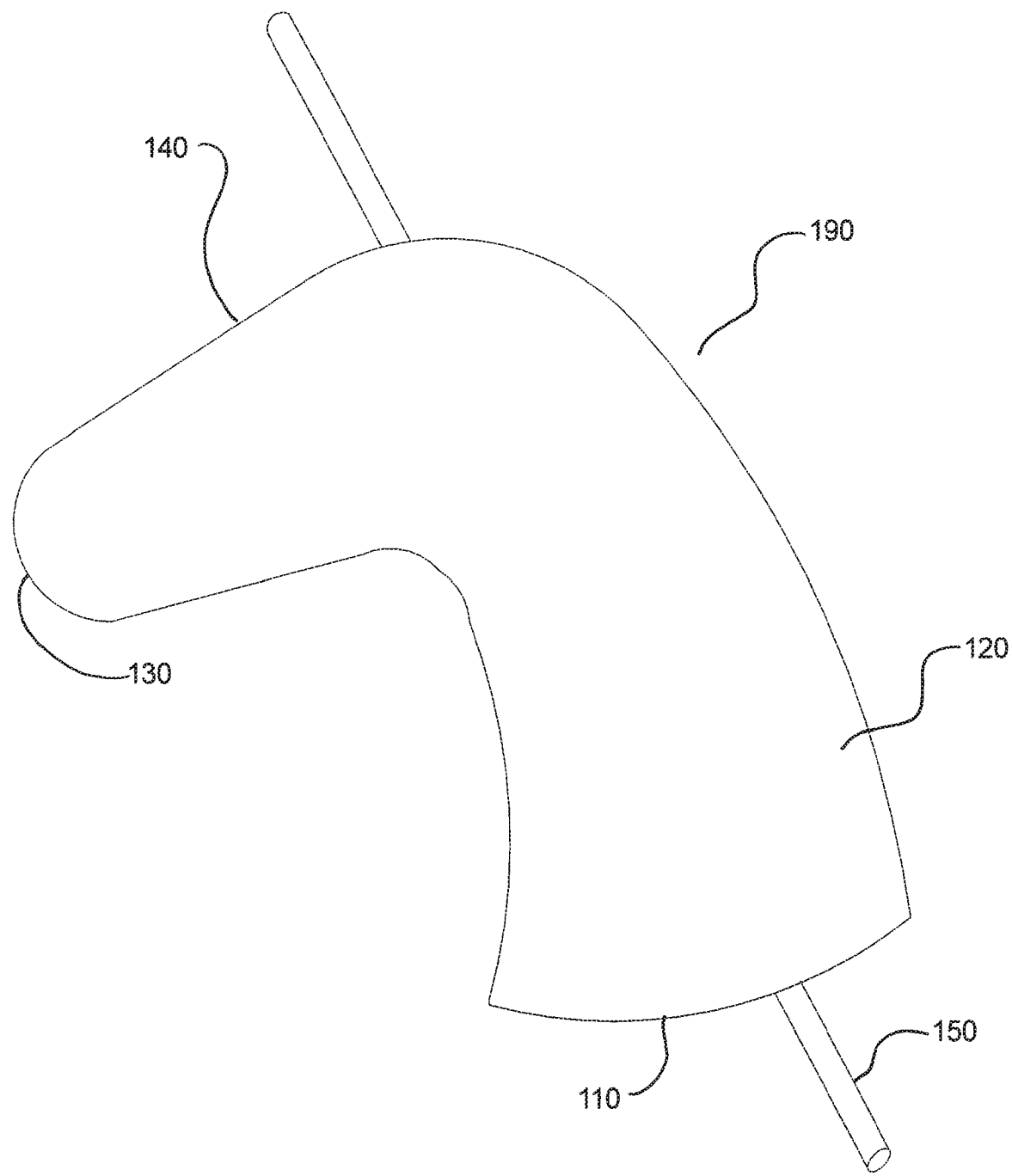
FIG. 6 is a side view of a fourth embodiment of the wind aeolipile employing a single nozzle
Figure 7:
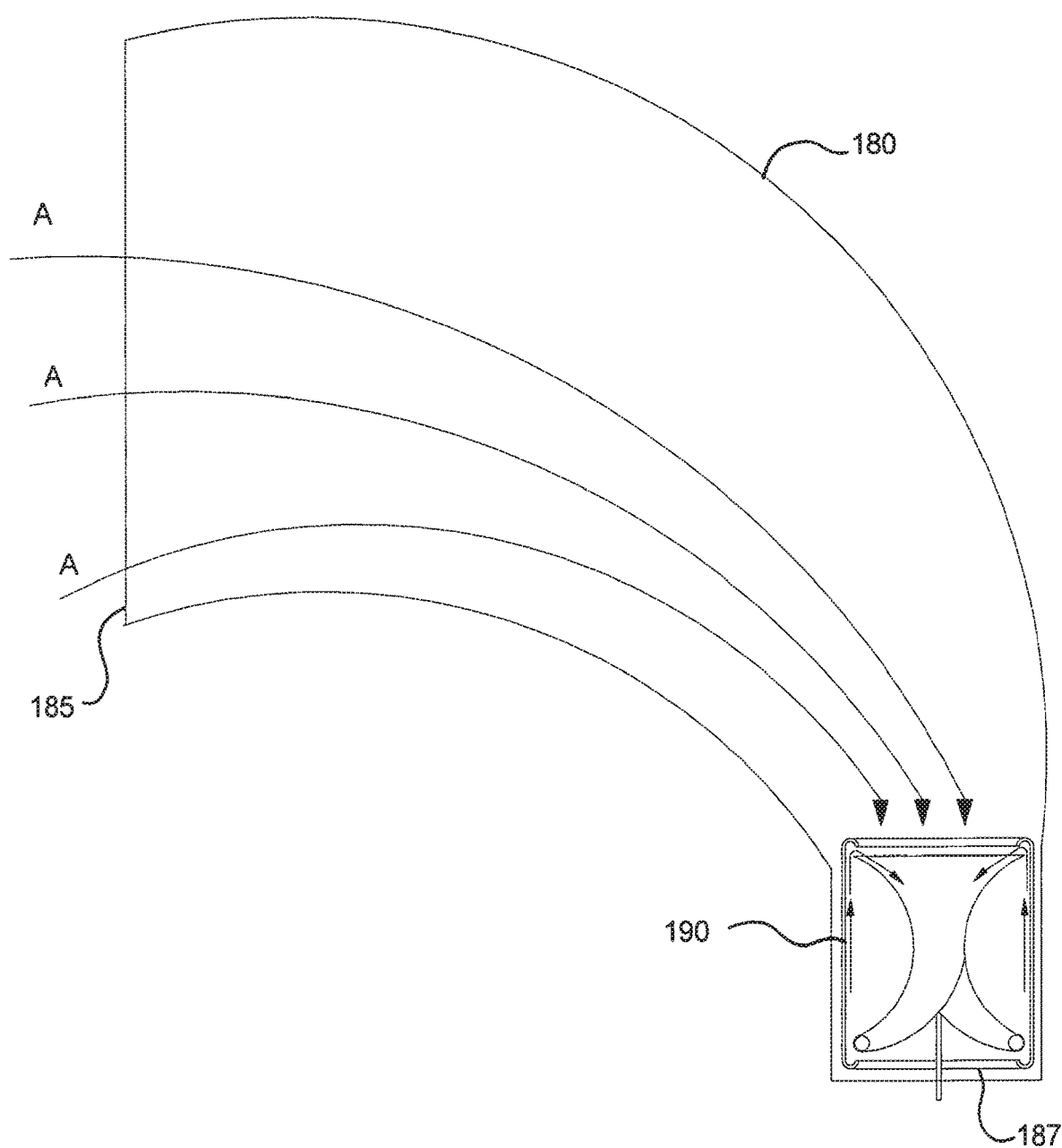
FIG. 7 is a view of an embodiment of the wind aeolipile incorporating a horn-shaped inlet extension
Figure 8:
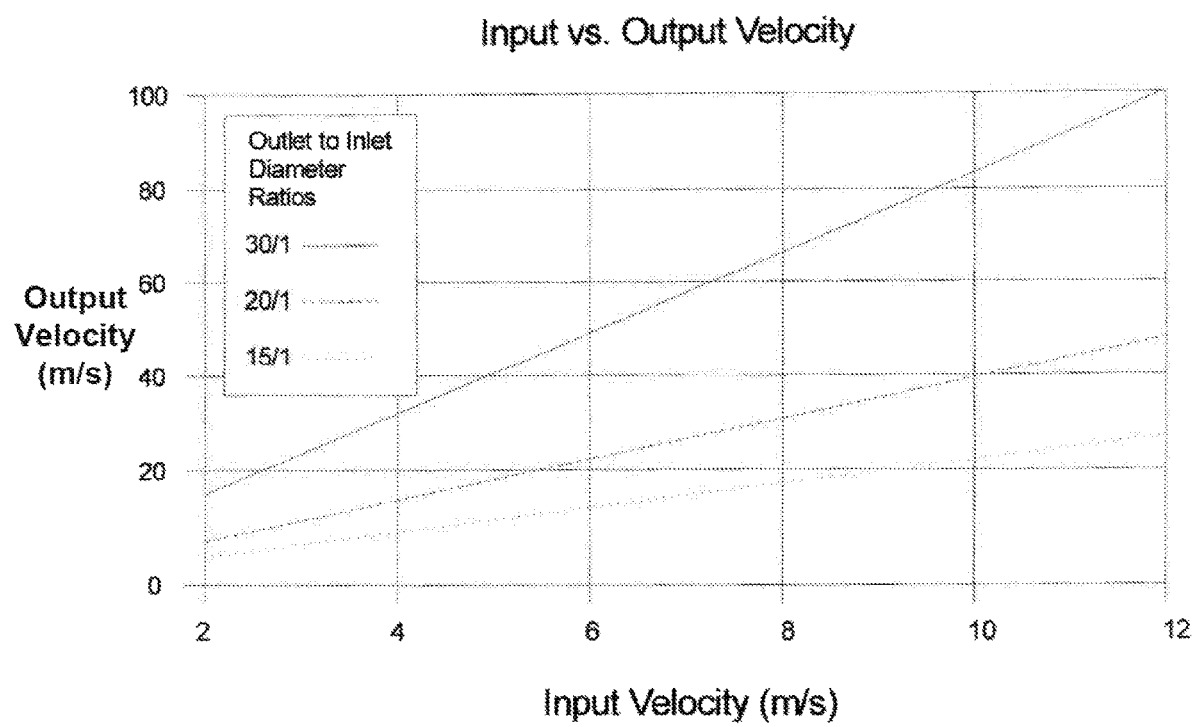
FIG. 8 is a chart of input vs. output airflow velocities of a horn-shaped inlet extension

In a fourth embodiment, as in FIG. 6, an essentially horn-shaped inlet extension (180) is placed with its outlet (187) proximal to any embodiment of this wind-aeolipile, as depicted in FIGS. 1-6. The horn-shaped inlet extension (180), has a larger diameter at the inlet (185) than it is at the outlet (187). This horn-shaped extension (180) may be curved or straight. The extension (180) acts to collect an increased volume of airflow (A), and also increases the velocity of the air-flow arriving at the outlet (130) of the extension (180).

At the outlet (187) of the horn, an aeolipile as described in any of the above embodiments or, optionally, a conventional turbine, is positioned. The horn-shaped inlet extension will yield higher output power due to the fact that it increases airflow input velocity to the aeolipile as it emerges at the extension's outlet (187).

Figure 9:
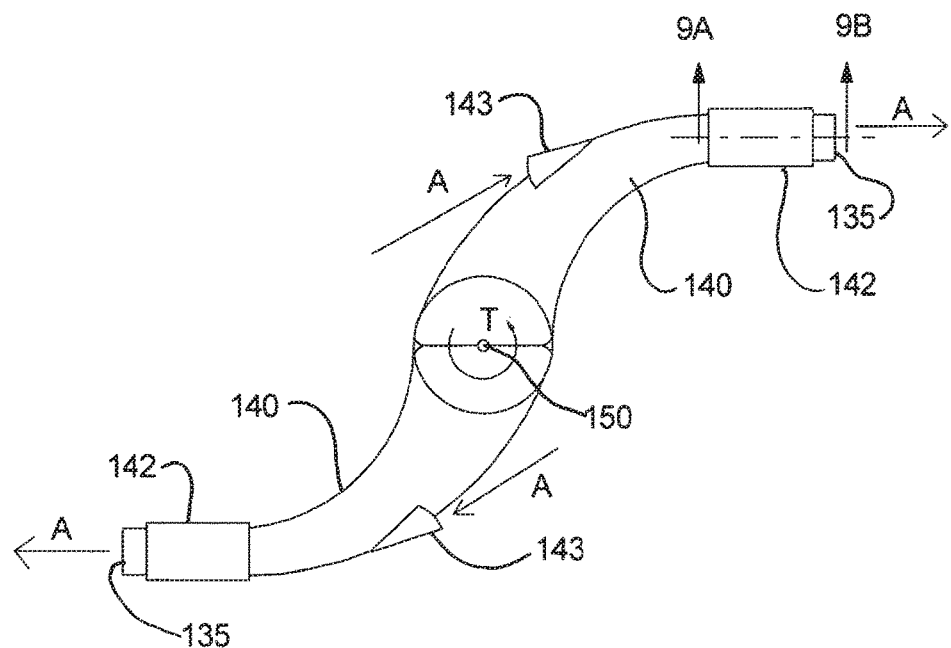
FIG. 9 is a front cross-sectional view of a wind aeolipile, showing means of varying the interior diameter of the device, proximal to a nozzle, and also showing an eductor-ejector inlet on each arm.
Figure 9A:
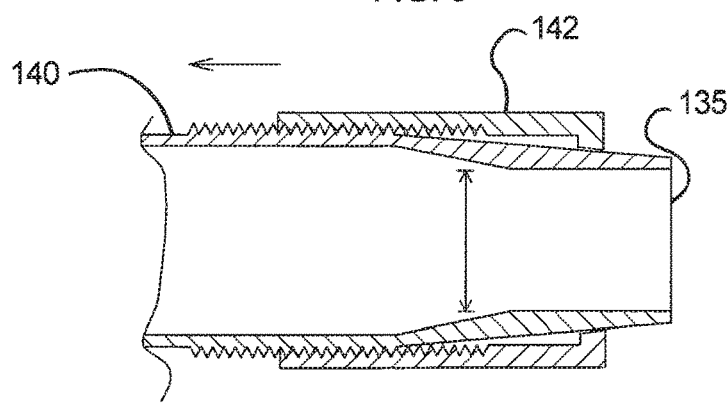
FIG. 9A is a front cross-sectional view of a wind aeolipile, showing means of varying the interior diameter of the device, proximal to a nozzle.
Figure 9B:
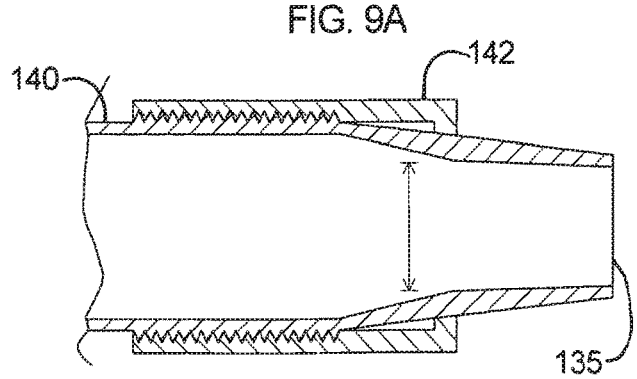
FIG. 9B is a front cross-sectional view of a wind aeolipile, showing means of varying the interior diameter of the device proximal to the nozzle.

In other embodiments the interior or exterior forms of the nozzles or conduits may be controllably variable in such ways as to influence the torque, rotation rate, or fluid flow rate through and/or around the device. Referring to FIGS. 9, 9A, and 9B, the means of varying the interior forms may include incorporation and control of interior baffles, or control of interior nozzle or conduit diameters, such as by employing a choke device (142) at points encountering the fluid flow.

Figure 10:
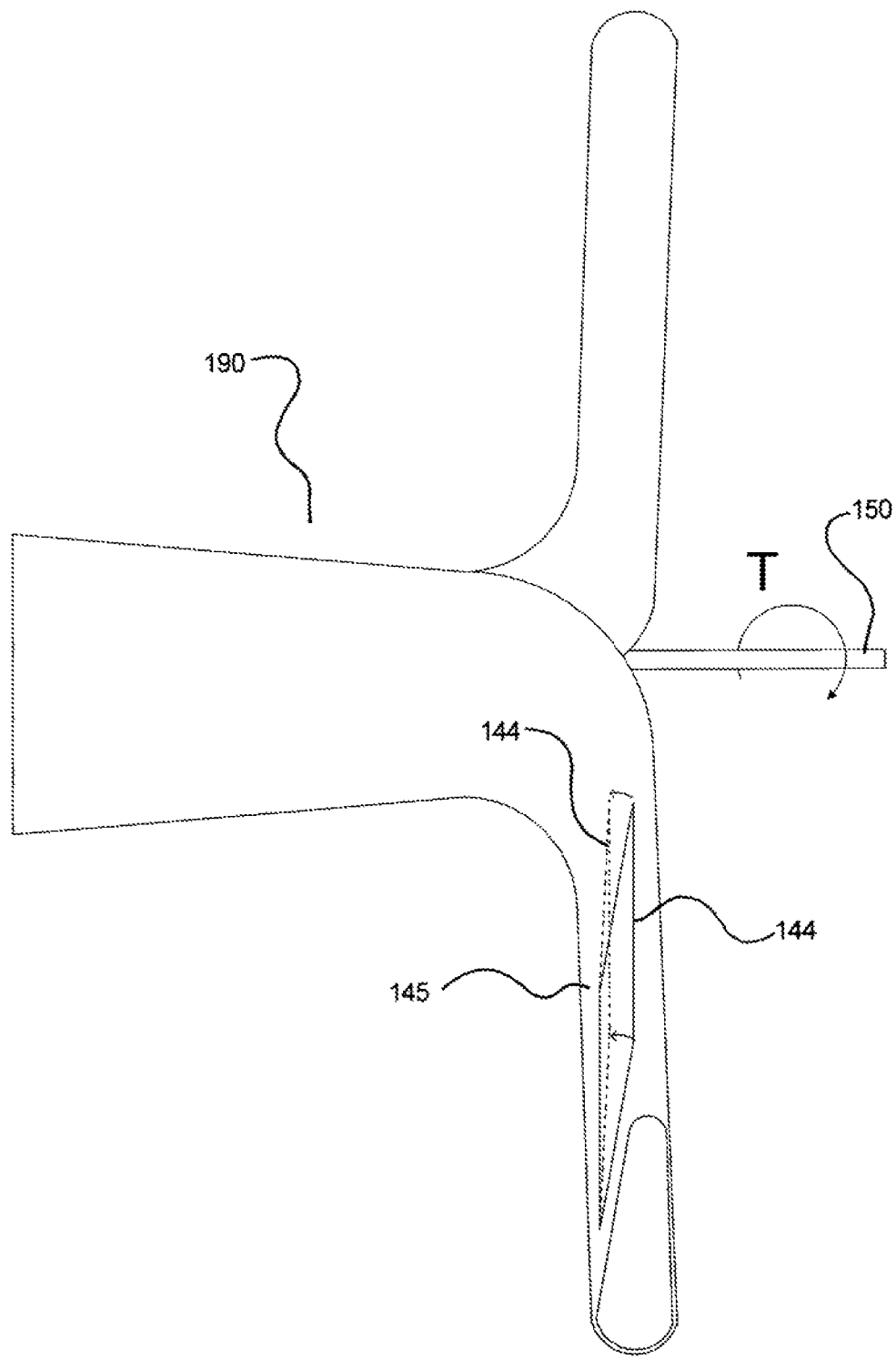
FIG. 10 is a side view of an aeolipile showing exterior control components in the form of flaps or spoilers.

Referring to FIG. 10, the means of varying the exterior forms may also, or alternatively, include incorporation and control of exterior components such as ailerons, flaps, or spoilers (144).

Figure 9C:
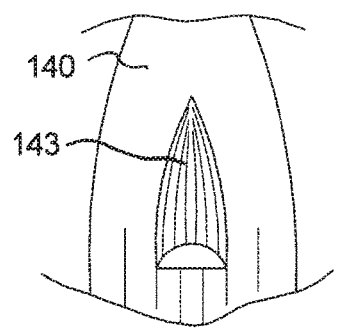
FIG. 9C is an interior view of the eductor-ejector inlet.

Referring again to FIG. 9, and to FIG. 9C, embodiments may further incorporate eductor-ejector functional components, the inlet of which is depicted as element (143). In such a configuration, the eductor-ejector draws in fluid flow (A), upstream of the area where the flow-rate through the aeolipile is greatest. This fluid is then accelerated and ejected along with the fluid flow that was already passing through the aeolipile, further augmenting potential thrust and torque.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A wind turbine, comprising:
a rotating main body with a front and a rear, wherein the main body has a hollow interior that narrows in diameter from the front to the rear, and wherein the main body rotates around an axis of rotation extending longitudinally between the front and the rear;
an inlet opening in the front of the main body adapted to collect wind and direct it to the hollow interior;
one or more outlet nozzles defining one or more outlet openings in the rear of the main body, the wind from the hollow interior directed to the one or more outlet nozzles, the one or more outlet nozzles extending at an angle from the rear of the main body, thereby causing the main body to rotate about the longitudinal axis; and
a shroud at least partially surrounding the main body and the one or more outlet nozzles, the shroud oriented to direct ejected wind from the one or more outlet nozzles toward the inlet opening.

2. The wind turbine of claim 1, wherein said one or more outlet nozzles is in the shape of an aerodynamic foil.

3. The wind turbine of claim 1, wherein the hollow interior of the main body is adjustable.

4. The wind turbine of claim 1, wherein said one or more outlet nozzles is adjustable.

5. An energy-generating device, comprising:
a rotating main body with a front and a rear, wherein the main body has a hollow interior that narrows in diameter from the front to the rear, and wherein the main body rotates around an axis of rotation extending longitudinally between the front and the rear;
an inlet opening in the front of the main body, said inlet opening adapted to collect fluid and direct it to the hollow interior;
at least one outlet opening in the rear of the main body, said at least one outlet opening adapted to expel collected fluid from the hollow interior; and
an eductor-ejector located between the inlet opening and the at least one outlet opening, said eductor-ejector adapted to draw additional fluid into the hollow interior.

6. The device of claim 5, wherein the fluid comprises air or a gas.

7. The device of claim 5, wherein the fluid comprises water or a liquid.

8. The device of claim 5, wherein said at least one outlet opening comprises an outlet nozzle extending at an angle from the main body.

9. The device of claim 8, wherein said outlet nozzle is in the shape of an aerodynamic foil.

10. The device of claim 5, wherein the hollow interior is adjustable.

11. The device of claim 8, wherein said outlet nozzle is adjustable.

12. The device of claim 5, further comprising an inlet funnel adapted to direct fluid into the inlet opening.

13. A device for generating energy, comprising:
an aeolipile with an axis of rotation, and one or more conduits, each of said one or more conduits having an intake end and an ejection end;
wherein each of said one or more conduits narrows in diameter from the intake end to the ejection end;
wherein the intake end of each of said one or more conduits is adapted to collect fluid from a fluid flow and direct it through the corresponding conduit to the corresponding ejection end;
wherein the ejection end of each of said one or more conduits is adapted to eject the fluid at an angle relative to the axis of rotation to cause the aeolipile to rotate around the axis of rotation; and
one or more eductor-ejector components located between the intake end and the ejection end of the corresponding one or more conduits, said one or more eductor-ejector components adapted to draw additional fluid into the corresponding one or more conduits.

* * * * *